(No Model.)
C. F. HUHLEIN.
WHIFFLETREE.
No. 459,911. Patented Sept. 22, 1891.
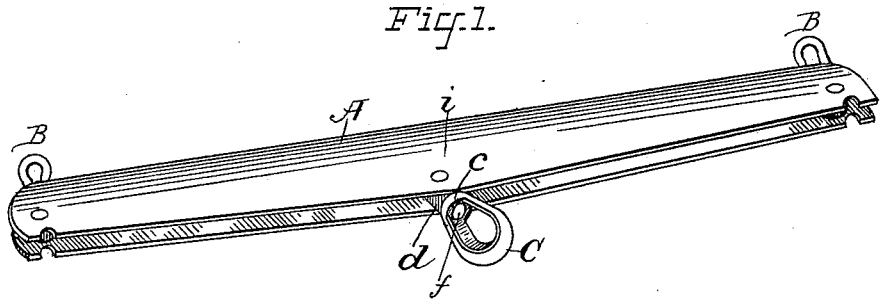
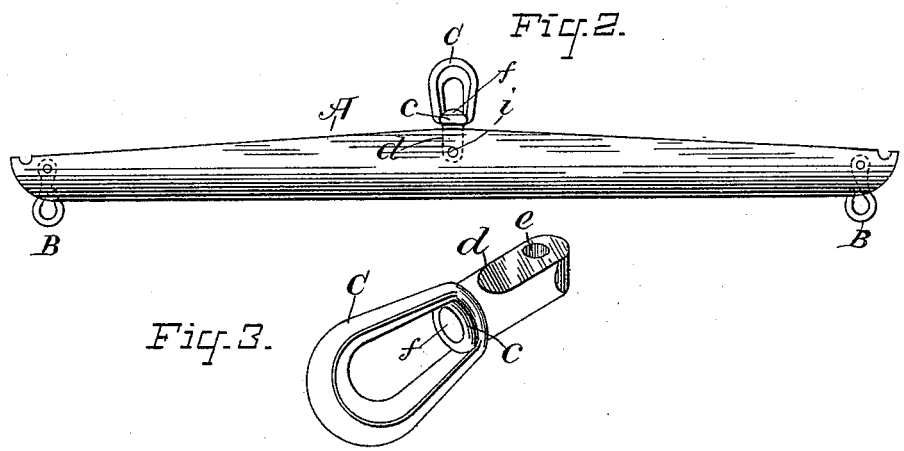
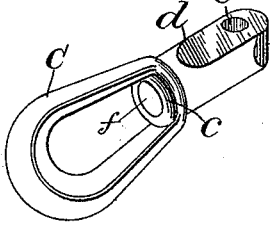
ATTEST:
INVENTOR:
C. F. Huhlein
By J. N. McIntire
Attorney

UNITED STATES PATENT OFFICE.

CHARLES F. HUHLEIN, OF LOUISVILLE, KENTUCKY, ASSIGNOR TO B. F. AVERY & SONS, OF SAME PLACE.

WHIFFLETREE.

SPECIFICATION forming part of Letters Patent No. 459,911, dated September 22, 1891.

Application filed April 13, 1891. Serial No. 388,668. (No model.)

*To all whom it may concern:*

Be it known that I, CHARLES F. HUHLEIN, of Louisville, in the county of Jefferson and State of Kentucky, have invented a new and useful Improvement in Whiffletrees; and I do hereby declare that the following is a full, clear, and exact description of the same, reference being had to the accompanying drawings, forming part of this specification.

My invention relates to that kind of whiffletrees in which the center ring is swiveled to the tree or is pivotally connected therewith, so that it can be turned into any desired relative position, and thus render unnecessary the use of a lap-ring.

My invention consists in the novel combination of devices hereinafter described, and that will be found more particularly pointed out and specifically defined in the claim of this specification.

To enable those skilled in the art to make and use whiffletrees embodying my improvement, I will now proceed to more fully describe my invention, referring by letters to the accompanying drawings, which form part of this specification, and in which I have shown my improvement carried into effect in the precise form in which I have so far successfully practiced it, though it may of course be carried out under more or less modification of form.

In the drawings, Figure 1 is a perspective drawing of a bent sheet-metal tree embodying my invention. Fig. 2 is a top view of the same, showing the center ring turned into or adjusted to a different position from that in which it is shown in Fig. 1. Fig. 3 is a view showing the center ring and its swivel-shank detached from the metallic tree.

The same part, wherever shown in different figures, will be found always designated by the same letter of reference.

A is a whiffletree composed of a sheet-iron plate bent into a sort of U shape in cross-section and provided with trace-hooks B, one at each end, that are pivotally hung in the cut-outs or longitudinally-recessed ends of the tree, after the fashion of a steel tree well known in the market as the "Avery tree," manufactured by B. F. Avery & Sons, of Louisville, Kentucky, under the Flatau patent.

C is the center ring or eye, by means of which the tree is designed to couple to or hitch onto the clevis of a plow, the coupling device of a street-car, or the coupling-pin of some other vehicle, &c. This ring or eye C is made with a perforated base or root portion $c$, in which is riveted the pivotal device $f$, by means of which it is flexibly connected with or is pivotally jointed to the lug $d$, as shown. This lug $d$ is perforated by a hole $e$, running transversely to the axis of the pivotal portion $f$ of said lug, and the latter is rigidly and permanently secured to the metallic tree A by means of a rivet $i$, passing through said perforation and also through the opposing plate-like portions of the U-shaped tree, between which portions of said tree the lug $d$ is rigidly confined or embraced, all as clearly shown in the drawings. (See Figs. 1, 2, and 3.)

In the use of a tree made substantially as herein shown and described the center ring C, it will be seen, may be turned into either a vertical or a horizontal plane, as the circumstances under which the tree has to be used may require, and in either case will serve as a perfect and close coupler to connect the center of the tree with any vehicle, implement, or other tree with which it may be desired to make a connection. At the same time, it will be seen, my improved tree, composed, as shown, of the bent metal plate having the lug $d$, to which the center plate having the lug $d$, to which the center ring C is pivotally connected, fastened in place between the opposing faces of said bent plate, is simple of construction, economical of manufacture, and exceedingly durable.

The parts C and $d$ I prefer to have made of malleable cast-iron, and these parts, pivotally connected, may be manufactured separately and then be easily applied to the steel-plate whiffletrees by a single rivet, (in each case,) as shown, and in case of any wearing out of the ring new duplicate parts may be substituted by removing and replacing the single rivet $i$.

What I claim as new, and desire to secure by Letters Patent, is—

In combination with the bent metallic tree A, the center ring C, and the lug $d$, the said ring being pivotally attached to said lug and the latter riveted fast between the plate-like portions of the tree, all substantially as set forth.

In witness whereof I have hereunto set my hand this 21st day of March, 1891.

CHARLES F. HUHLEIN.

In presence of—
SAML. HENDERSON, Jr.,
ED S. GARNER.